(12) United States Patent
Sano

(10) Patent No.: US 7,363,826 B2
(45) Date of Patent: Apr. 29, 2008

(54) ROTATING MEMBER-SUPPORTING STRUCTURE AND ROTATION DETECTING DEVICE HAVING THE SAME

(75) Inventor: Tadashi Sano, Tokyo (JP)

(73) Assignee: Alps Electric Co., Ltd, Tokyo (JP)

( * ) Notice: Subject to any disclaimer, the term of this patent is extended or adjusted under 35 U.S.C. 154(b) by 231 days.

(21) Appl. No.: 11/150,441

(22) Filed: Jun. 10, 2005

(65) Prior Publication Data

US 2005/0279179 A1 Dec. 22, 2005

(30) Foreign Application Priority Data

Jun. 18, 2004 (JP) .............................. 2004-181551

(51) Int. Cl.
*F16H 57/12* (2006.01)
*G01B 11/26* (2006.01)

(52) U.S. Cl. .................. 73/862.328; 33/1 PT

(58) Field of Classification Search ........... 250/231.13, 250/231.14, 231.15, 231.16, 231.17, 231.18; 73/862.08, 862.328, 432.1; 33/1 PT, 1 N
See application file for complete search history.

(56) References Cited

U.S. PATENT DOCUMENTS

| 5,859,425 | A | * | 1/1999 | Mleinek et al. | ........ | 250/231.13 |
| 6,272,912 | B1 | | 8/2001 | Sano | | |
| 6,370,967 | B1 | * | 4/2002 | Kouketsu et al. | ...... | 73/862.333 |
| 2003/0019113 | A1 | * | 1/2003 | Kofink et al. | ............... | 33/1 PT |

* cited by examiner

*Primary Examiner*—Edward Lefkowitz
*Assistant Examiner*—Punam Patel
(74) *Attorney, Agent, or Firm*—Brinks Hofer Gilson & Lione

(57) ABSTRACT

Three elastic member-holding units are provided along the circumference of a cylindrical guide unit, which is a supporting unit of a first code wheel to hold a ring-shaped metallic elastic member, which is made of a band-like body of stainless steel or the like, and the metallic elastic member is extended to the inner circumference of the guide unit. In addition, the metallic elastic member extended to the inner circumference of the guide unit elastically supports the shaft of the first code wheel, which is a rotating member.

6 Claims, 5 Drawing Sheets

ROTATING MEMBER-SUPPORTING STRUCTURE AND ROTATION DETECTING DEVICE HAVING THE SAME

BACKGROUND OF THE INVENTION

1. Field of the Invention

This application claims the benefit of priority to Japanese Patent Application No. 2004-181551 filed on Jun. 18, 2004, herein incorporated by reference.

The present invention relates to a rotating member-supporting structure and a rotation detecting device having the same, or more specifically, to a means for suppressing the eccentricity of the rotating member with respect to a guide unit.

2. Description of the Related Art

Conventionally, as a rotation detecting device which is applied to a rudder angle sensor for a car or the like, a device is known, which includes a case-shaped attaching member on which a through-hole for a rotating member is provided, a rotating member which is held through the through-hole, a code plate which is attached to the rotating member and rotatably housed in the attaching member, and signal detecting elements which are provided inside the attaching member and operate in conjunction with the code plate to detect signals in accordance with the rotating state of the rotating member (for example, see Japanese Unexamined Patent Application Publication No. 2000-241144).

In this type of rotation detecting device, since the through-hole which is provided on the attaching member functions as a guide unit of the rotating member, the clearance between the guide unit and the rotating member needs to be as small as possible in order to suppress the eccentricity of the rotating member and to obtain high resolution of signal detection.

Meanwhile, the attaching member and the rotating member are made of an unreinforced plastic material such as polyolefin methacrylate, acrylic resin, or polybutylene terephthalate in the related art because of the excellent abrasion resistance.

The rudder angle sensor for a car must be sustainable for operation in the temperature range of −40° C. to +85° C. Therefore, it must be expected that there will be clearance in the range of 0.3 mm to 0.5 mm, since thermal expansion of the attaching member and the rotating member and thermal distortion of the attaching member cause positional deviation between the guide units provided at the upper and lower surfaces of the attaching member when the above-mentioned plastic material is used.

However, in recent years, since high resolution of one degree or more is required in this type of the rotation detecting device, if the clearance between the guide unit and the rotating member is allowed in the range of 0.3 mm to 0.5 mm, the eccentricity of the rotating member becomes large, and it is impossible to realize required resolution.

SUMMARY OF THE INVENTION

The present invention has been finalized in view of the drawbacks inherent in the conventional rotation detecting device, and it is an object of the present invention to provide a rotating member-supporting structure and a rotation detecting device having the same which can suppress the eccentricity of a rotating member with respect to a guide unit with high precision.

In order to solve the problems, an aspect of the invention is a rotating member-supporting structure including a rotating member; a cylindrical guide unit supporting the rotating member rotatably, and a metallic elastic member which is attached to the guide unit so as not to rotate. At least three portions of the metallic elastic member along the circumference are extended into the clearance between the rotating member and the guide unit to rotatably and elastically support the rotating member.

As described above, if the metallic elastic member is interposed between the rotating member and the guide unit, the central axis of the rotating member can be stably held in the center of the guide unit irrespective of the size of the clearance between the rotating member and the guide unit. In addition, if at least three portions along the circumference of the rotating member are elastically supported by the metallic elastic member, the eccentricity of the rotating member with respect to the guide unit can be suppressed with high precision. Further, if the metallic elastic member is used as the elastic member, the size, the thickness and the manufacturing cost can be reduced.

Further, in the rotating member-supporting structure, elastic member-holding units are provided in at least three places of the guide unit along the circumference to hold the metallic elastic member, which prevent the rotation of the metallic elastic member.

As described above, if the elastic member-holding units are provided in at least three places of the guide unit, positional deviation of the metallic elastic member with respect to the guide unit and dropout of the metallic elastic member from the guide unit can be prevented reliably, therefore quietness and operational stability of the rotating member-supporting structure can be enhanced.

According to still another aspect of the rotating member-supporting structure of the invention, the elastic member-holding units are provided at regular intervals along the circumference of the guide unit and, in the intermediate portion of each of the elastic member-holding units, the rotating member is elastically supported to rotate by the metallic elastic member.

As described above, if the elastic member-holding units are provided at regular intervals along the circumference of the guide unit, and the rotating member is elastically supported by the metallic elastic member in the intermediate portion of each of the elastic member-holding units, the rotating member can be elastically supported with respect to the guide unit evenly. Therefore, the central axis of the rotating member can be reliably held in the center of the guide unit, and the eccentricity of the rotating member with respect to the guide unit can be suppressed with high precision.

Further, in the rotating member-supporting structure, the rotating member and the guide unit are made of a resin material, and the metallic elastic member is made of stainless steel and has a band-shape.

As described above, if the metallic elastic member is made of stainless steel and has a band-shape, the strength of the metallic elastic member can be increased, and the thickness and width of the metallic elastic member can be reduced. Also, the metallic elastic member can have a stable elastic characteristic. Therefore, the space efficiency between the rotating member and the guide unit can be enhanced, the size and thickness of the rotating member-supporting structure can be further reduced, and a variation in the rotation torque of the rotating member caused by a temperature change can be decreased. In addition, since a required metallic elastic member can be manufactured only by bending a band-like stainless body, the metallic elastic member and thus the rotating member-supporting structure can be manufactured at a low cost.

On the other hand, another aspect of the invention is a rotation detecting device including a housing; a code wheel that is housed in the housing and can rotate; a code plate that is attached to the code wheel; signal detecting elements that operate in conjunction with the code plate to detect signals in accordance with the rotating state of the code wheel, in which a cylindrical guide unit is formed in the housing to support the code wheel, thereby the code wheel can rotate; and a metallic elastic member, which is attached to the guide unit so as not to rotate, and at least three portions along the circumference thereof are extended into the clearance between the rotating member and the guide unit so as to rotatably and elastically support the rotating member.

As described above, if the metallic elastic member is interposed between the code wheel, which is a rotating member, and the guide unit of the housing, which is an attaching member, the central axis of the code wheel can be stably held in the center of the guide unit irrespective of the size of the clearance between the code wheel and the guide unit.

DESCRIPTION OF THE PREFERRED EMBODIMENT

Figure 1:
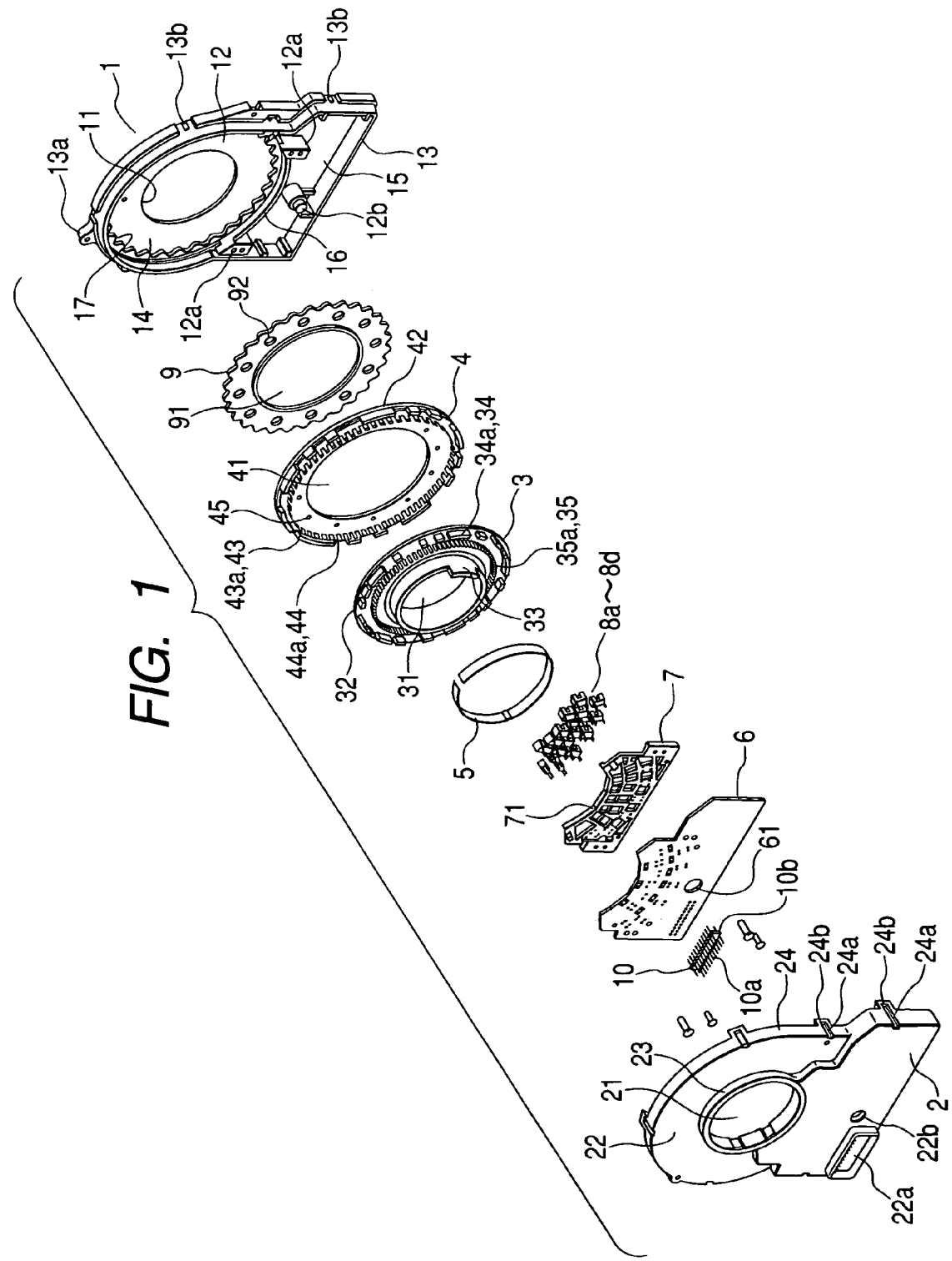
FIG. 1 is an exploded perspective view illustrating a rotation detecting device according to the present embodiment.
Figure 2:
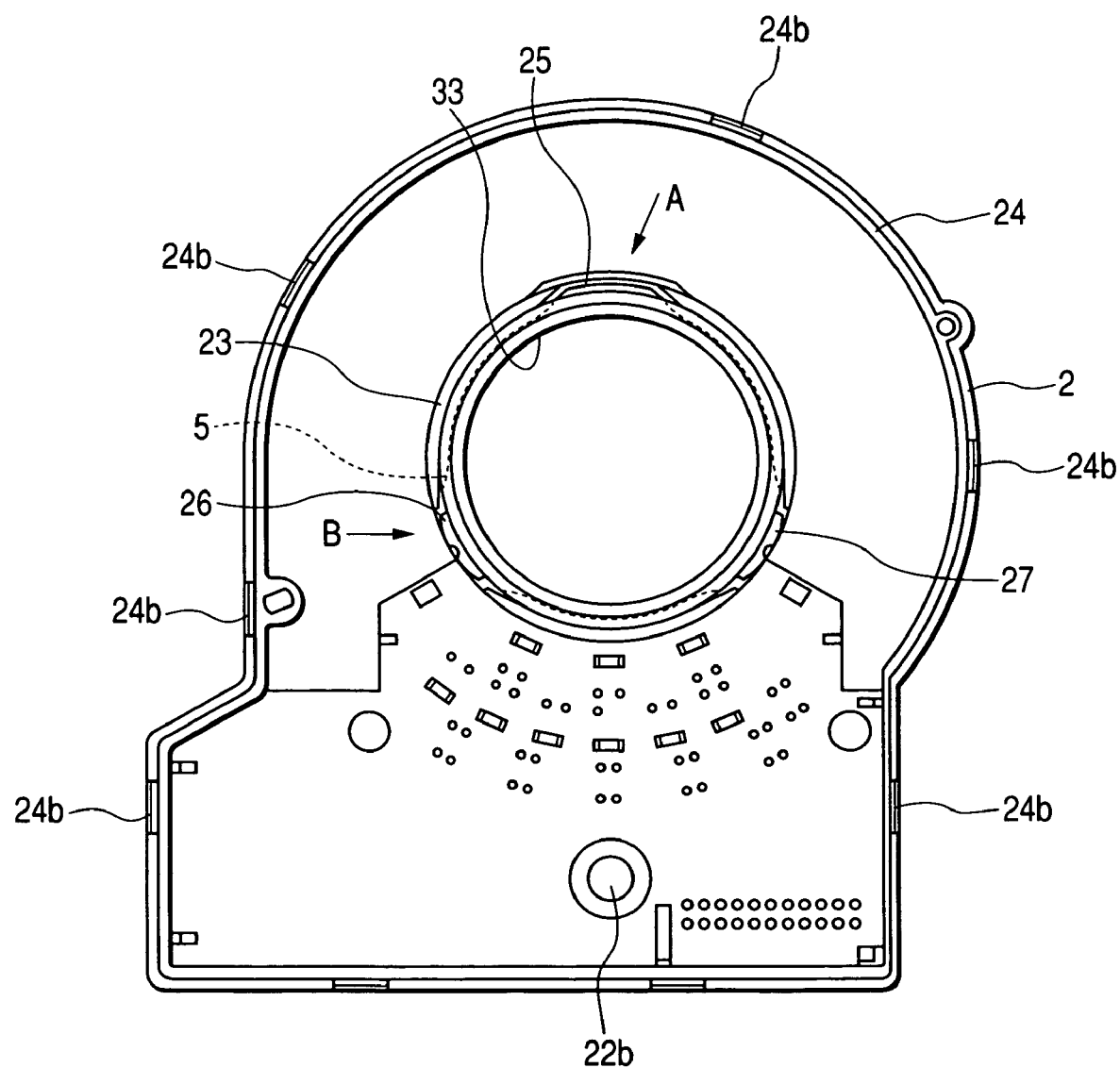
FIG. 2 is an internal diagram illustrating a cover according to the embodiment.
Figure 3:
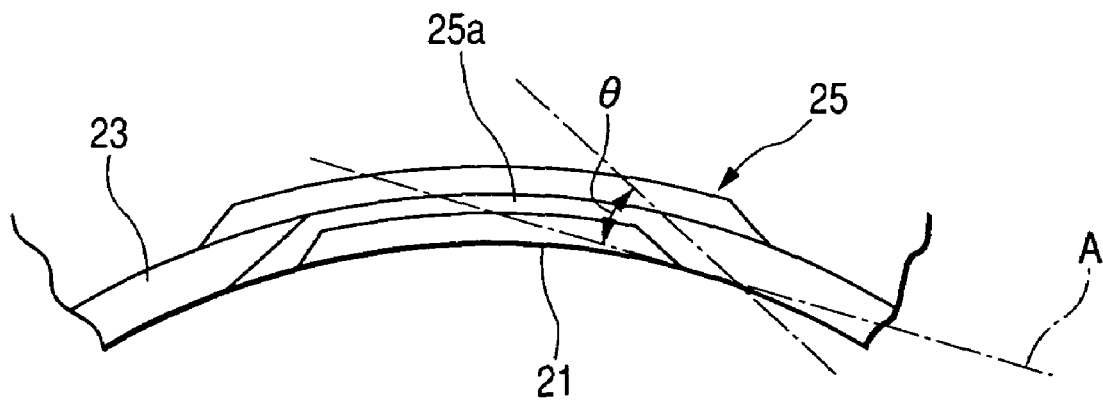
FIG. 3 is an enlarged diagram of A portion of FIG. 2.
Figure 4:
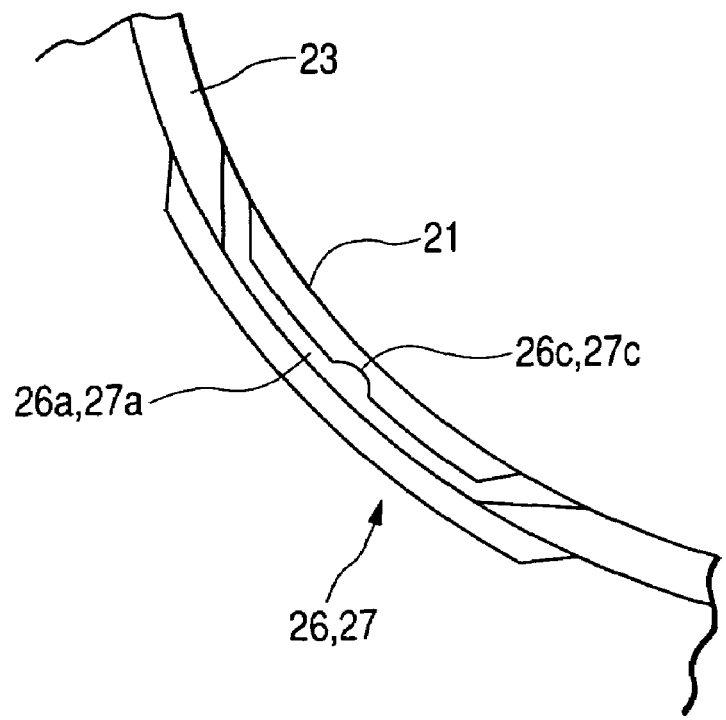
FIG. 4 is an enlarged diagram of B portion of FIG. 2.
Figure 5:
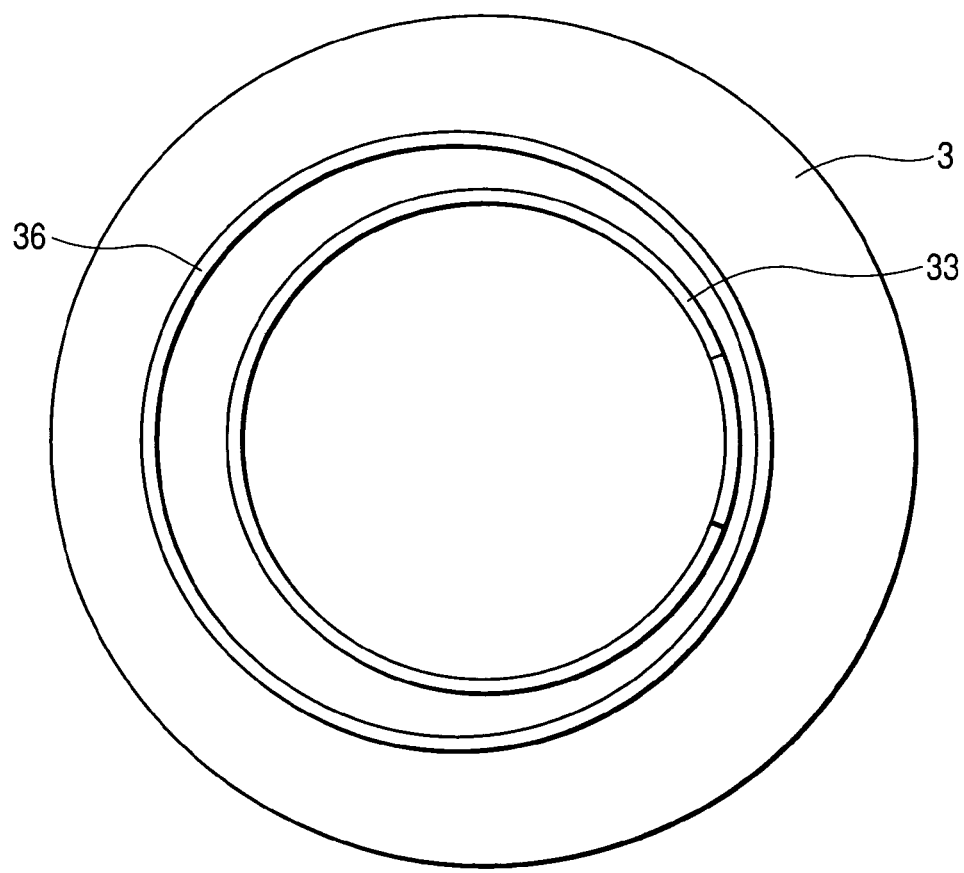
FIG. 5 is a rear view of a first code wheel according to the embodiment.
Figure 6:
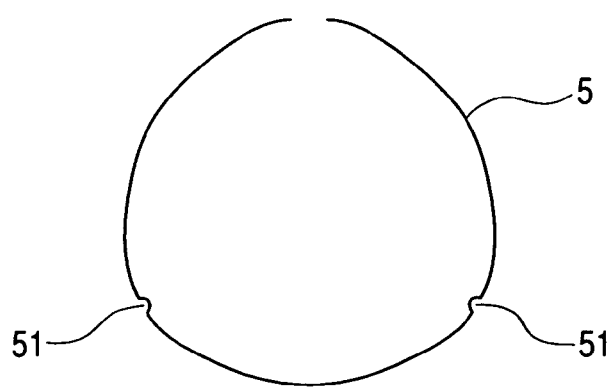
FIG. 6 is a plan view illustrating a metallic elastic member according to the embodiment.
Figure 7:
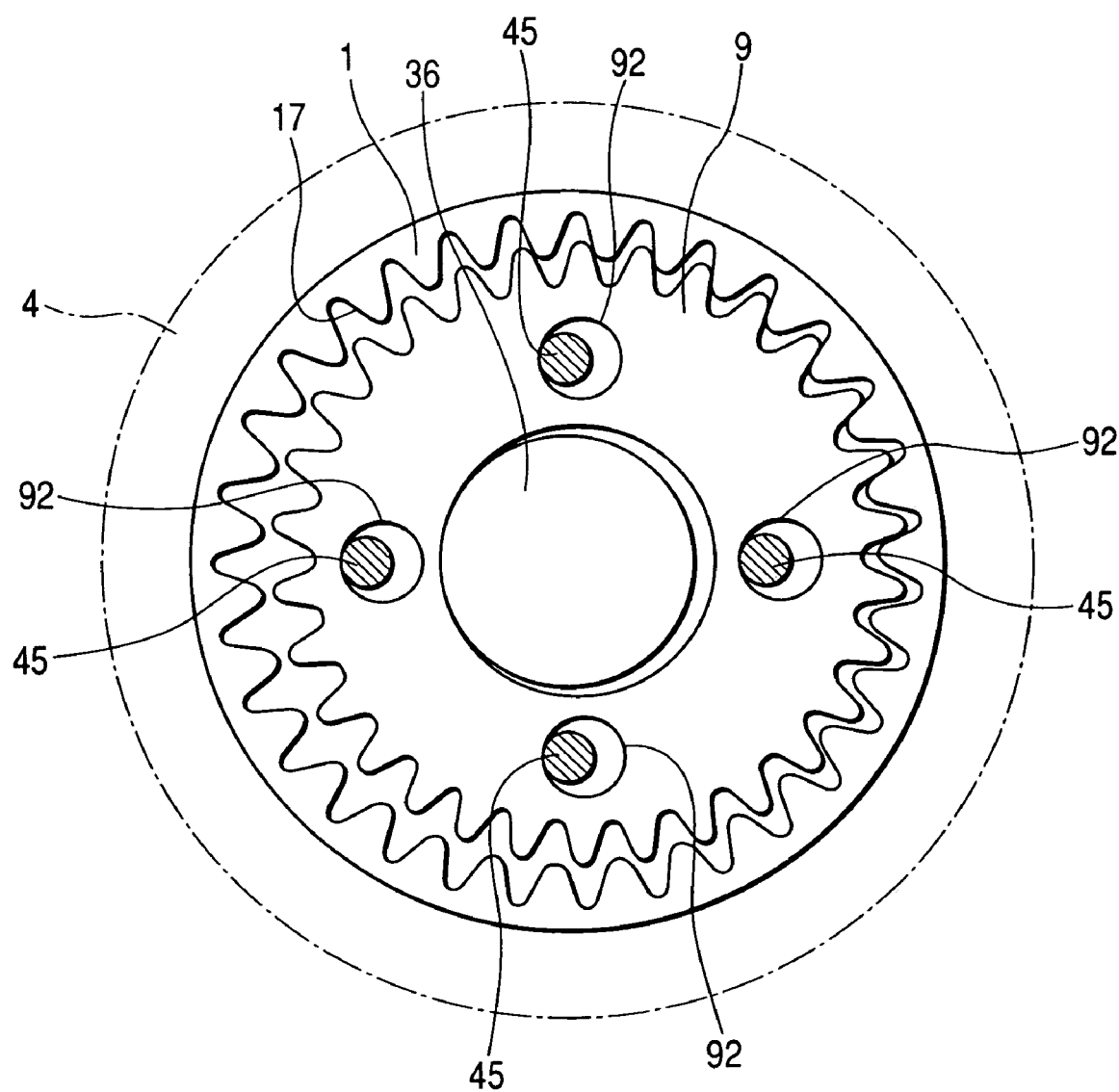
FIG. 7 is an internal diagram of a case showing a coupling state among a planetary gear, an internal gear, and a second code wheel according to the embodiment.

Hereinafter, an embodiment of a rotating member-supporting structure according to an aspect of the present invention will be described with reference to FIGS. 1 to 7 using an example of a code wheel-supporting structure in a rotation detecting device. FIG. 1 is an exploded perspective view of a rotation detecting device according to the present embodiment, FIG. 2 is an internal view illustrating a cover according to the embodiment, FIG. 3 is an enlarged diagram of A portion of FIG. 2, FIG. 4 is an enlarged diagram of B portion of FIG. 2, FIG. 5 is a rear view of a first code wheel according to the embodiment, FIG. 6 is a plan view illustrating a metallic elastic member according to the present embodiment, and FIG. 7 is an internal diagram of a case showing a coupling state among a planetary gear, an internal gear, and a second code wheel.

As shown in FIG. 1, the rotation detecting device according to the embodiment mainly includes a case 1; a cover 2; a first code wheel 3 and a second code wheel 4 which are housed in a housing constituted with a combination of the case 1 and the cover 2, and can rotate; a metallic elastic member 5 which is attached to the cover 2 to support the first code wheel 3 rotatably and elastically; a circuit board 6 which is set in the inner surface of the case 1; a signal detecting element receiver 7 which is attached to the circuit board 6; a required number of signal detecting elements 8 which are housed in a predetermined array in the signal detecting element receiver 7, and terminals of which are connected to terminals formed on the circuit board 6 respectively; a planetary gear 9, which is rotated by the first code wheel 3 and drives the second code wheel 4 at a predetermined decelerating rate; and a connector pin 10, one end of which is attached to the circuit board 6, and the other end of which faces a connector insertion hole provided at the cover 2.

The case 1 is constituted with a bottom plate 12 having a central opening 11, a circumferential wall 13, which is erected from the outer circumferential edge of the bottom plate 12 and has a constant height, and a circular-arc shaped partitioning wall 16, which is erected between a circular code wheel housing unit 14 and a rectangular circuit board housing unit 15. An internal gear 17 which is engaged with the planetary gear 9 is formed concentric with the central opening 11 on the inner surface of the code wheel housing unit 14. In addition, a circuit board attaching boss 12a for screwing the circuit board 6 and a positioning projection 12b for positioning the cover 2 with respect to the case 1 are formed on the inner surface of the bottom plate 12. A case attaching boss 13a for screwing the case 1 to a required stator unit, for example, a chassis of a car, and a locking claw 13b for snap-coupling the cover 2 to the case 1 are formed on the outer surface of the circumferential wall 13.

The cover 2 includes a top plate 22 having the central opening 21, a cylindrical guide unit 23 erected outward from the inner circumferential edge of the top plate 22, and a circumferential wall 24 erected inward from the outer circumferential edge of the top plate 22. The cover 2 has substantially the same size and planar shape as those of the case 1. Three elastic member-holding units 25 to 27 are provided at regular intervals along the circumference and on the inner surface of the guide unit 23 as shown in FIG. 2. A connector insertion hole 22a for inserting an external connector (not shown) is provided in the corner, and a positioning hole 22b which is fitted with the positioning projection 12b formed in the case 1 is provided on the top plate 22. In addition, an engagement projection 24b having an engagement hole 24a which is engaged with the locking claw 13b formed in the case 1 is formed on the outer surface of the circumferential wall 24.

The elastic member-holding unit 25 has a concave groove 25a for holding the end of the metallic elastic member 5 inserted therein. The concave groove 25a connects a circular-arc shaped groove formed in the inner surface of the guide unit 23 and inclined grooves extending from both ends to the central opening 21. As shown in FIG. 3, the inclined groove is formed at an acute angle $\theta$ with respect to tangent line a, which is lined to the central opening 21, in the portion facing the central opening 21. Accordingly, if the end of the metallic elastic member 5 is inserted to the circular arc-shaped groove from the inclined groove of the concave groove 25a, the metallic elastic member 5 is pressed against the inner wall of the respective grooves and thus reliably held by the holding unit 25.

Meanwhile, the elastic member-holding unit 26 (27) has a concave groove 26a (27a) for holding a part of the intermediate portion of the metallic elastic member 5 inserted therein. The concave groove 26a (27a) connects a circular-arc shaped groove formed in the inner surface of the guide unit 23 and the inclined grooves extending from both ends to the central opening 21. In addition, engagement units 26c (27c) are provided at any one of the wall surfaces facing the circular-arc shaped groove. The engagement units 26c (27c), which are engaged with bent units 51 as shown in FIG. 6, are formed in concave or convex shapes. In the embodiment, the engagement units 26c (27c) are formed in a concave shape as shown in FIG. 4 so as to be engaged with the bent units 51 of the metallic elastic member 5 as shown in FIG. 2, therefore the metallic elastic member 5 can be prevented from moving along the circumference of the guide unit 23 or dropping out from the guide unit 23.

As described above, if three elastic member-holding units 25 to 27 are provided along the circumference of the guide unit 23, a positional deviation or dropout of the metallic elastic member 5 with respect to the guide unit 23 can be reliably prevented, therefore quietness and operational stability of the rotating member-supporting structure can be enhanced. In addition, if the elastic member-holding units 25 to 27 are provided at regular intervals along the circumference of the guide unit 23, the first code wheel 3 can be elastically supported by the metallic elastic member 5 in the intermediate portions of the respective elastic member-holding units 25 to 27, therefore, the first code wheel 3 can be elastically supported evenly with respect to the guide unit 23, and thus the eccentricity of the first code wheel 3 with respect to the guide unit 23 can be suppressed with high precision.

The case 1 and the cover 2 are incorporated by engaging the locking claw 13b formed in the case 1 with the engagement hole 24a formed in the cover 2, thereby constituting the housing for housing other members 3 to 10.

The first code wheel 3 is constituted with a first code plate 32 having the central opening 31 and a cylindrical rotating-body coupling unit 33 erected from the central opening 31. A first signal detection track 34, from which multiple light shielding plates 34a for detecting signals project in a required array pattern, and a second signal detection track 35, from which multiple light shielding plates 35a for detecting signals project in a required array pattern, are formed concentrically with each other on a surface of the first code plate 32. In addition, a planetary gear attaching unit 36 for revolving the planetary gear 9 around the rotating-body coupling unit 33 project eccentrically with respect to the rotating-body coupling unit 33 from the rear surface of the first code plate 32 as shown in FIG. 5, and the planetary gear attaching unit 36 is inserted to be engaged with the central opening 91 of the planetary gear 9. The first code wheel 3 is attached to a rotating body (not shown) such as a steering shaft passing through the central opening 31 to rotate in conjunction with the rotating body.

The second code wheel 4 is constituted with a second code plate 42 having the central opening 41. A third signal detection track 43, from which multiple light shielding plates 43a for detecting signals project in a required array pattern, and a fourth signal detection track 44, from which multiple light shielding plates 44a for detecting signals project in a required array pattern, are formed concentrically with each other on a surface of the second code plate 42. In addition, a plurality of engagement projections 45, which couple the planetary gear 9, project at regular intervals from the rear surface of the second code plate 42 as shown in FIG. 7.

As shown in FIGS. 1, 2, and 6, the metallic elastic member 5 is made of a band-like metallic piece having excellent elasticity such as stainless steel, phosphor bronze or the like, and formed to have a ring-shape having a slightly smaller diameter than that of the guide unit 23. Bent units 51, which are engaged with the engagement units 26c (27c) formed in the guide unit 23, are formed in the intermediate portion of the metallic elastic member 5. As described above, if the metallic elastic member 5 is made of a band-like metallic body such as stainless steel or the like, the band-like metallic body can have high elasticity, thin thickness, narrow width, and stable elastic property, therefore, the metallic member 5 can be reliably prevented from being deviated from the guide unit 23 or dropping out from the guide unit 23. In addition, the band-like metallic body elastically supports the rotating-body coupling unit 33, thereby the clearance between the inner circumferential surface of the guide unit 23 and the outer circumferential surface of the rotating-body coupling unit 33 of the first code wheel 3 becomes equal over the entire circumference. Therefore, the eccentricity of the first code wheel 3 with respect to the guide unit 23 can be suppressed with high stability and precision, and thus the operational stability of an absolute angle detecting device can be enhanced.

The circuit board 6 is formed to have a shape capable of being housed in the circuit board housing unit 15 of the case 1 and the cover 2. A through-hole 61, though which the positioning projection 12b formed in the case 1 passes, is provided in the required position of the circuit board 6. A required circuit pattern including terminals for electrically connecting terminals of signal detecting elements 8 and the connector 10 is formed on the top surface of the circuit board 6.

The signal detecting element receiver 7, in which the plurality of signal detecting elements 8 are disposed in a predetermined array, has a compartmentalized detecting element attaching unit 71 for attaching the respective signal detecting elements 8 individually, and is screwed down to the circuit board 6.

A photo-interrupter, in which light emitting elements and light receiving elements are disposed opposite with each other at such intervals that the light shielding plates 34a, 35a, 43a, and 44a formed in the first and the second code wheels 3 and 4 can be inserted, is used as the signal detecting elements 8. Each signal detecting element 8 is attached to the signal detecting element receiver 7 via the required light shielding plates 34a, 35a, 43a, and 44a, thereby the light emitting elements and the light receiving elements are disposed at the front and rear surfaces.

The planetary gear 9 is formed in a ring shape having the central opening 91 and engagement holes 92, which are engaged with the engagement projections 45 projecting from the rear surface of the second code wheel 4. The number of teeth of the planetary gear 9 is set based on the number of teeth of the internal gear 17 and the decelerating rate of the first code wheel 3 to the second code wheel 4. For example, when the number of teeth of the internal gear 17 is set to 30 and the number of teeth of the planetary gear 9 is set to 28, the decelerating rate of the first code wheel 3 to the second code wheel 4 can be set to $1/15$.

The connector 10 is constituted with a required number of connector pins 10a and a holding unit 10b made of insulating resin for holding the respective connector pins 10a in a required array. One end of the connector pin 10a is connected with the circuit board 6, and the other end is disposed to face the connector insertion hole 22a provided at the cover 2.

Hereinafter, an assembling method of the rotation detecting device using the components described above will be described.

First, the metallic elastic member 5 is attached to the inner surface of the guide unit 23 of the cover 2. The attaching of the metallic elastic member 5 to the guide unit 23 is performed by the following assembling operation. The bent units 51 formed in the metallic elastic member 5 are engaged with the engagement units 26c and 27c formed in the elastic member-holding units 26 and 27, the intermediate portion of the metallic elastic member 5 is inserted into the grooves 26a and 27a of the elastic member-holding units 26 and 27, and both ends of the metallic elastic member 5 are inserted into the groove 25a of the elastic member-holding unit 25. As described above, the metallic elastic member 5 is formed in a ring shape having a slightly smaller diameter than that of the guide unit 23, therefore the portions of the metallic elastic member 5, which are not held by the elastic member-holding units 25 to 27, are disposed in the positions away from the inner surface of the guide unit 23 as shown by dashed lines in FIG. 2. As a matter of course, the metallic elastic member 5 extending from the inner surface of the guide unit 23 is set to hold the cylindrical rotating-body coupling unit 33 formed in the first code wheel 3 to the extent that the first code wheel 3 is not inhibited from rotating smoothly.

In addition, the planetary gear 9, the second code wheel 4, and the first code wheel 3 are housed sequentially in the inner surface of the case 1. At this time, the planetary gear 9 is engaged with the internal gear 17 formed in the inner surface of the case 1, and the engagement projections 45 projecting from the rear surface of the second code wheel 4 are engaged with the engagement holes 92, thereby the planetary gear 9 is coupled with the second code wheel 4. In this state, the outer circumferential surface of the engagement projection 45 and the inner circumferential surface of the engagement hole 92 are always in contact with each other as shown in FIG. 7. Accordingly, the rotation of the planetary gear 9 is transmitted to the second code wheel 4 with no delay. In addition, the planetary gear attaching unit 36 formed in the rear surface of the first code plate 32 is inserted into the central opening 91 so as to abut on the inner circumference of the central opening 91 in the planetary gear 9. Therefore, the revolution of the first code wheel 3 is transmitted to the planetary gear 9, thereby the planetary gear 9 is revolved around the internal gear 17.

Further, a required number of signal detecting elements 8 are attached in a predetermined array to the respective detecting element attaching units 71 formed in the signal detecting element receiver 7, and the signal detecting element receiver 7, to which the signal detecting elements 8 are attached, is screwed at predetermined positions of the circuit board 6. In addition, the connector 10 is connected to the predetermined positions of the circuit board 6. Also, the circuit board 6 having the signal detecting element receiver 7, the signal detecting elements 8, and the connector 10 is screwed at the predetermined position of the case 1, and the required signal detecting elements 8 are set in a required array on the first to fourth signal detection tracks 34, 35, 43, and 44 respectively.

After that, the locking claw 13b formed in the case 1 is engaged with the engagement hole 24a formed in the cover 2 to incorporate the case 1 with the cover 2. At this time, the rotating-body coupling unit 33 of the first code wheel 3 is inserted into the guide unit 23 of the cover 2 as shown in FIG. 2, thereby the first code wheel 3 is elastically held by the metallic elastic member 5.

When the rotation detecting device assembled in the above-described manner is used as a rudder-angle sensor for a car, a steering shaft is inserted into the rotating-body coupling unit 33 so as to be coupled with the rotating-body coupling unit 33 integrally, and the housing is attached to a stator unit such as a chassis of a car by using the case attaching boss 13a formed in the case 1.

In the rotation detecting device according to the embodiment, the metallic elastic member 5 is interposed between the guide unit 23 of the cover 2 and the rotating-body coupling unit 33 of the first code wheel 3, therefore, the central axis of the first code wheel 3 can be stably held in the center of the guide unit 23 irrespective of the size of the clearance between the guide unit 23 and the rotating-body coupling unit 33. In addition, since three places of the first code wheel 3 along the circumference are elastically supported by the metallic elastic member 5, a variation in the rotation torque of the rotating member caused by a temperature change can be decreased, and an operational stability of the rotation detecting device can be enhanced. Further, since the metallic elastic member 5 is used as an elastic member, the size, thickness and manufacturing cost of the elastic member can be reduced, thereby the size, thickness and manufacturing cost of the rotating member-supporting structure can also be reduced.

Although the rotating member-supporting structure according to an aspect of the invention has been described using an example of the code wheel-supporting structure in the rotation detecting device in the embodiment, the purport of the invention is not limited thereto, and the invention can be applied to other rotating body-supporting structures.

In addition, although the signal detecting system is formed by a combination of the light-shielding plates and the photo-interrupter in the embodiment, the purport of the invention is not limited thereto, and the signal detecting system can be constituted with a combination of an optical pattern such as through holes or notches and a photo-interrupter, a combination of a magnetic pattern and magnetic detection elements, or a combination of a resistor body pattern and a collecting brush.

In the rotating member-supporting structure according to an aspect of the invention, since the metallic elastic member is interposed between the rotating member and the guide unit, the central axis of the rotating member can be stably held in the center of the guide unit, and the eccentricity of the rotating member with respect to the guide unit can be suppressed irrespective of the size of the clearance between the rotating member and the guide unit. In addition, since the metallic elastic member is used as an elastic member, the size, thickness and manufacturing cost of the elastic member can be reduced, thereby the size, thickness and manufacturing cost of the rotating member-supporting structure can also be reduced.

In the rotation detecting device according to an aspect of the invention, the metallic elastic member is interposed between the code, wheel which is a rotating member, and the guide unit of the housing, which is an attaching member. Therefore, the central axis of the code wheel can be stably held in the center of the guide unit irrespective of the size of the clearance between the code wheel and the guide unit, the eccentricity of the code wheel with respect to the guide unit can be suppressed, and resolution of signals detected by the code plate and the signal detecting elements can be enhanced. In addition, since the metallic elastic member is used as the elastic member, the size, thickness and manufacturing cost of the elastic member can be reduced, and the size, thickness and manufacturing cost of the rotation detecting device can be reduced.

The invention claimed is:

1. A rotating member-supporting structure comprising:
    a rotating member;
    a cylindrical guide unit rotatably supporting the rotating member;
    a metallic elastic member, which is attached to the guide unit so as not to rotate; and
    elastic member-holding units which are provided in at least three places of the cylindrical guide unit along a circumference to hold the metallic elastic member so as not to rotate,
    wherein at least three portions along a circumference of the metallic elastic member are extended into a clearance between the rotating member and the guide unit so as to rotatably and elastically support the rotating member,
    wherein the metallic elastic member is a band-like metallic piece formed to have a ring shape, and
    wherein an end of the metallic elastic member is inserted into one of at least three elastic member-holding units and the intermediate portions of the metallic elastic member are inserted into the other elastic member-holding units.

2. The rotating member-supporting structure according to claim 1,
    wherein the elastic member-holding units are provided at regular intervals along a circumference of the cylindrical guide unit, and the rotating member is rotatably and elastically supported by the metallic elastic member in intermediate portions of the respective elastic member-holding units.

3. The rotating member-supporting structure according to claim 2,

4. The rotating member-supporting structure according to claim 1,
wherein the rotating member and the cylindrical guide unit are made of a resin material and the metallic elastic member is made of a band-like stainless steel body.
wherein the rotating member and the cylindrical guide unit are made of a resin material and the metallic elastic member is made of a band-like stainless steel body.

5. The rotating member-supporting structure according to claim 1,
wherein the elastic member-holding units are concave grooves.

6. The rotating member-supporting structure according to claim 5,
wherein the band-like metallic piece has bent units formed in concave or convex shapes and the concave grooves corresponding to the other elastic member-holding units have engagement units engaging with the bent units.

* * * * *

UNITED STATES PATENT AND TRADEMARK OFFICE
CERTIFICATE OF CORRECTION

PATENT NO. : 7,363,826 B2
APPLICATION NO. : 11/150441
DATED : April 29, 2008
INVENTOR(S) : Tadashi Sano It is certified that error appears in the above-identified patent and that said Letters Patent is hereby corrected as shown below:

Column 9, in claim 3, line 5, after "claim 2," insert the following as a new paragraph.

--wherein the rotating member and the cylindrical guide unit are made of a resin material and the metallic elastic member is made of a band-like stainless steel body.--

Column 9, in claim 4, delete lines 6 through 8.

Signed and Sealed this

Twenty-sixth Day of August, 2008

JON W. DUDAS
*Director of the United States Patent and Trademark Office*